(12) United States Patent
Malrait et al.

(10) Patent No.: US 7,902,789 B2
(45) Date of Patent: Mar. 8, 2011

(54) METHOD AND SYSTEM FOR DETECTING THE CABLING ERRORS BETWEEN A STARTER AND AN ELECTRIC MOTOR

(75) Inventors: Francois Malrait, Jouy sur Eure (FR); Quentin Delafontaine, Poissy (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 375 days.

(21) Appl. No.: 11/860,828

(22) Filed: Sep. 25, 2007

(65) Prior Publication Data

US 2008/0088990 A1    Apr. 17, 2008

(30) Foreign Application Priority Data

Oct. 12, 2006   (FR) ...................................... 06 54229

(51) Int. Cl.
*H02P 1/16*   (2006.01)
(52) U.S. Cl. ........................................ 318/778; 318/771
(58) Field of Classification Search .................. 318/778, 318/771
See application file for complete search history.

(56) References Cited

U.S. PATENT DOCUMENTS

| 6,038,114 | A | 3/2000 | Johnson | |
|---|---|---|---|---|
| 6,304,053 | B1 | 10/2001 | Johnson | |
| 6,426,603 | B1 | 7/2002 | Johnson | |
| 7,196,491 | B2 * | 3/2007 | Mayhew et al. | 318/778 |
| 7,224,557 | B2 * | 5/2007 | Kinsella et al. | 361/2 |

FOREIGN PATENT DOCUMENTS

WO   WO 2004/114492 A2   12/2004

* cited by examiner

*Primary Examiner* — Bentsu Ro
*Assistant Examiner* — Erick Glass
(74) *Attorney, Agent, or Firm* — Oblon, Spivak, McClelland, Maier & Neustadt, L.L.P.

(57) ABSTRACT

A method and a system for controlling an asynchronous electric motor for detecting cabling errors between the electric motor and a motor starter. The electric motor including three windings distributed over three branches in a delta configuration and controlled by the motor starter, which includes power semiconductors directly connected in series within the three branches of the delta configuration of the three windings. In one embodiment, the method includes applying a voltage in a first branch of the delta, priming the semiconductor of the first branch after a priming delay, measuring an electrical current generated within the first branch during the priming, and determining the configuration of the cabling of the first branch according to the measured electrical current.

17 Claims, 6 Drawing Sheets

METHOD AND SYSTEM FOR DETECTING THE CABLING ERRORS BETWEEN A STARTER AND AN ELECTRIC MOTOR

The present invention relates to a method and a system for controlling an asynchronous electric motor. The control method and system according to the invention more particularly allow cabling errors between the electric motor and its starter to be detected.

An asynchronous electric motor can be controlled by a starter in several ways. The cabling between the motor and the starter can notably be configured in a 'Y' or 'delta' configuration. The configuration 'line-delta' and the configuration 'winding-delta' are both possible. In the configuration winding-delta, the thyristor assemblies of the starter are directly connected in series in the three branches of the delta configuration of the windings of the motor.

In the delta-windings configuration, there are six cables to be connected. Three cables allow the outputs of the starter to be connected to the inputs of the motor and three cables allow the outputs of the motor to be fed back onto the three phases of the electrical supply network.

This configuration is simple to produce, however when the motor and the starter are not near to one another, cabling errors are common. One of the errors consists, for example, in inverting two phases. Another error consists, for example, in short-circuiting one or more windings of the motor.

The U.S. Pat. Nos. 6,038,114, 6,426,603 and 6,304,053 describe methods for detecting the cabling errors between a starter and a motor. The detection is carried out using the voltages measured across the terminals of the control switches of the starter.

The aim of the invention is to provide a method for controlling an electric motor allowing any potential cabling errors between the motor and its starter to be diagnosed.

This goal is achieved by a method for controlling an asynchronous electric motor comprising three windings distributed over three branches in delta configuration, the motor being controlled by a starter comprising power semiconductors directly connected in series within the three branches of the delta configuration of the windings of the motor, the said method being characterized in that it comprises the following steps:
- application of a voltage in a first branch of the delta,
- after a priming delay, priming of the semiconductor of the first branch,
- measurement of the electrical current generated within the first branch during the priming operation,
- determination of the configuration of the cabling of the first branch as a function of the measured electrical current.

According to a first variant embodiment, the priming of the semiconductor of the first branch is a first priming operation effected after a first priming delay, the control method according to the invention also comprising:
- a second priming of the semiconductor of the first branch effected after a second priming delay separate from the first priming delay,
- a measurement of the electrical current generated during the second priming operation,
- the determination of the configuration of the cabling of the first branch being carried out by comparison between a maximum value of the electrical current measured during the first priming operation and a maximum value of the electrical current measured during the second priming operation.

According to a second variant embodiment, the determination of the configuration of the cabling of the first branch is effected by comparison between the nominal current of the motor and a maximum value of the electrical current measured during the priming operation after a priming delay of a given value.

In this second variant, the value of the priming delay corresponds to that for which the maximum current measured in the first branch during the priming operation is theoretically equal to the nominal current of the motor when the first branch is correctly cabled.

According to a third variant embodiment, the priming of the semiconductor of the first branch is a first priming operation effected after an initial priming delay, and the method additionally comprises:
- several successive priming operations on the semiconductor of the first branch making the priming delay vary each time until a final priming delay is obtained for which the maximum electrical current measured is substantially equal to the nominal current,
- the determination of the configuration of the cabling of the first branch is carried out by comparison between the initial priming delay and the final priming delay.

In this third variant embodiment, the value of the initial priming delay corresponds to that for which the maximum current measured in the first branch during the priming operation is theoretically equal to the nominal current of the motor when the first branch is correctly cabled.

The control method according to the invention is for example implemented successively on each of the three branches of the delta configuration of the windings of the motor.

The goal defined hereinabove is also achieved by a system for controlling an asynchronous electric motor comprising three windings distributed over three branches in delta configuration, the motor being controlled by a starter comprising power semiconductors directly connected in series within the three branches of the delta configuration of the windings of the motor, the said system comprising:
- means for applying a voltage in a first branch of the delta,
- control means for performing a priming of the semiconductor of the first branch after a priming delay,
- means for measuring an electrical current generated in the first branch during the priming operation,
- processing means for determining the configuration of the cabling of the first branch as a function of the measured current.

According to a first variant embodiment, the priming of the semiconductor of the first branch is a first priming operation carried out after a first priming delay, the system additionally comprising:
- control means for performing a second priming of the semiconductor of the first branch carried out after a second priming delay different from the first priming delay,
- means for measuring an electrical current generated during the second priming operation,
- the processing means carrying out a comparison between a maximum value of the electrical current measured during the first priming operation and a maximum value of the electrical current measured during the second priming operation with a view to determining the configuration of the cabling of the first branch.

According to a second variant embodiment, the processing means carry out a comparison between the nominal current of the motor and a maximum value of the electrical current measured during the priming operation after a priming delay of a given value in order to determine the configuration of the cabling of the first branch.

In this second variant embodiment, the value of the priming delay corresponds to that for which the measured maximum current in the first branch during the priming operation is theoretically equal to the nominal current of the motor when the first branch is correctly cabled.

According to a third variant embodiment, the priming of the semiconductor of the first branch is a first priming operation carried out after an initial priming delay, and the system additionally comprises:
  control means for performing several successive primings of the semiconductor of the first branch making the priming delay vary each time until a final timing delay is obtained for which the measured maximum electrical current is substantially equal to the nominal current,
  the processing means carrying out a comparison between the initial priming delay and the final priming delay in order to determine the configuration of the cabling of the first branch.

In this third variant embodiment, the value of the initial priming delay corresponds to that for which the measured maximum current in the first branch during the priming operation is theoretically equal to the nominal current of the motor when the first branch is correctly cabled.

Other features and advantages will become apparent in the detailed description that follows making reference to one embodiment presented by way of example and represented by the appended drawings, in which:

FIGS. 4B to 4E show various configurations in which the cabling between the motor and the starter is incorrect.

Figure 9:
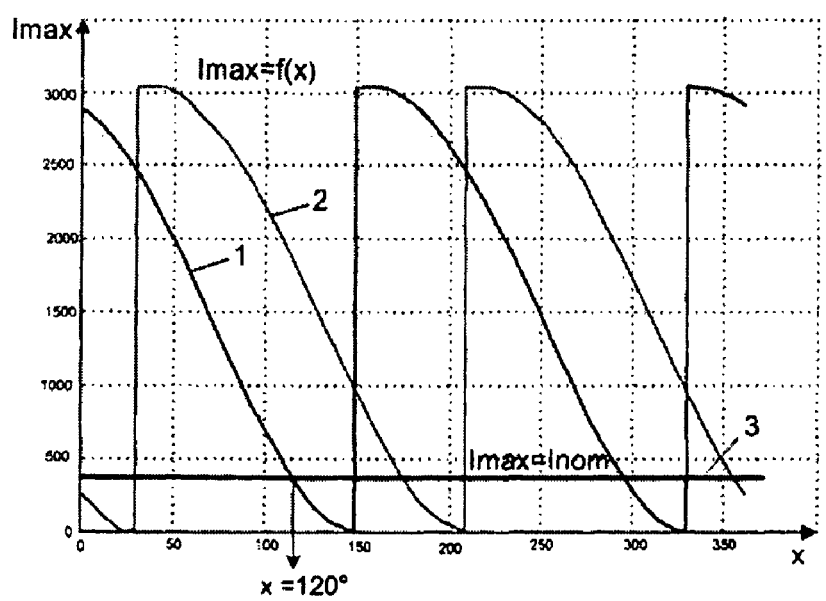

FIG. 9 shows the curves Imax=f(x). The solid line curve is that obtained when the cabling of a branch is correct. The dashed line curve shows that obtained when the cabling of the branch is incorrect. The diagram also shows the curve Imax=Inom using a thicker line.

In a known manner, an asynchronous electric motor M comprises three windings U, V, W distributed over three branches for example in delta configuration. The control of the asynchronous motor M is for example effected by a starter D connected to the motor M. A starter D itself comprises power semiconductor arms T1, T2, T3 formed on each phase from at least two thyristors in flip-flop configuration. In the appended figures, the thyristors are represented by switches.

Figure 1:
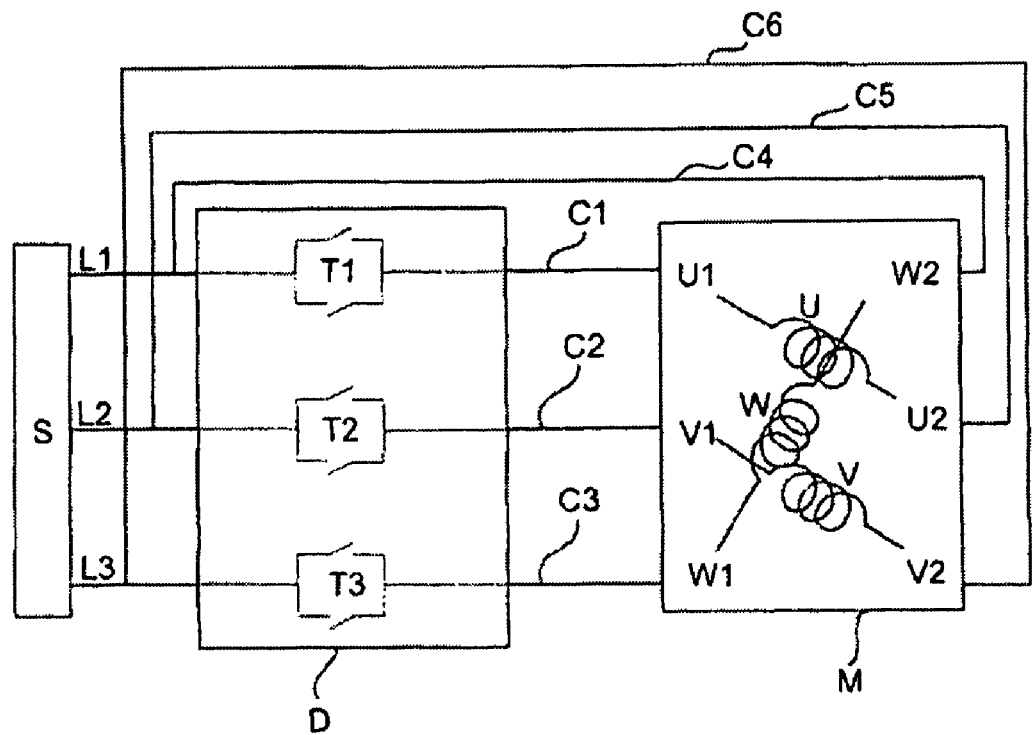
FIG. 1 shows schematically the motor and the starter correctly cabled to obtain a delta configuration in which the thyristors of the starter are directly connected in series within the three branches of the windings of the motor.

The connection between the motor M and the starter D may be made in several ways. One of the ways consists in placing the thyristor arms T1, T2, T3 of the starter D in the windings U, V, W of the motor M (FIG. 1). According to this cabling scheme, each thyristor arm T1, T2, T3 of the starter D is connected in series with a different winding of the motor M.

Figure 2:
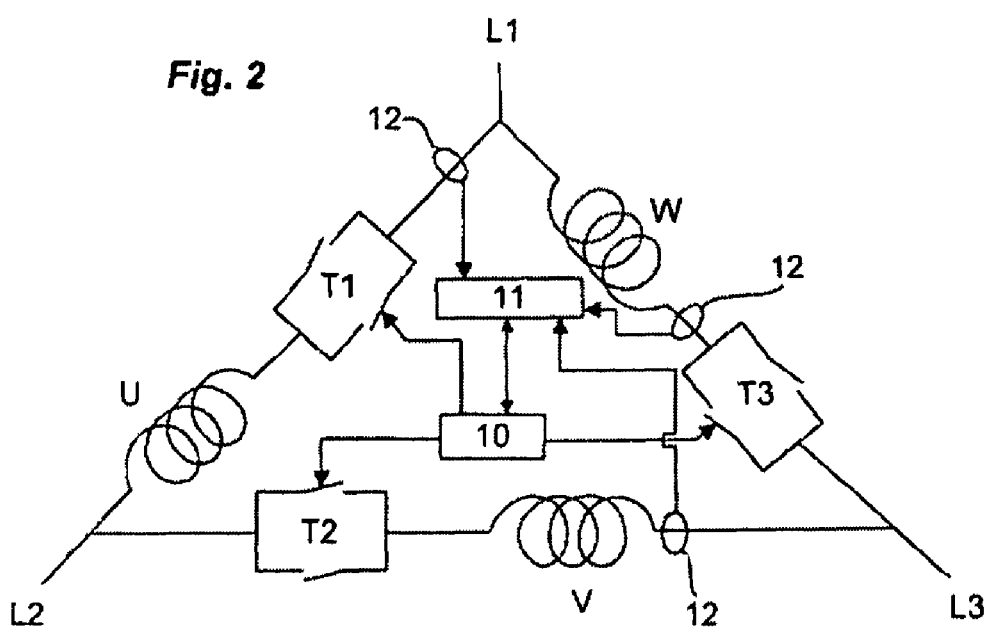
FIG. 2 shows the delta configuration resulting from the cabling shown in FIG. 1.

For this cabling scheme between the motor M and the starter D, six cables C1, C2, C3, C4, C5, C6 are connected between the motor M and the starter D. With reference to FIG. 2, using the three cables C1, C2, C3, the outputs of the starter D are connected to the inputs U1, V1 and W1 of the motor M and using the other three cables C4, C5, C6, the outputs W2, U2 and V2 of the motor M are respectively fed back onto the three phases L1, L2 and L3 of the electrical supply network S.

The phases of the electrical supply network are connected to the input of the starter. By convention, they are denoted L1, L2, L3 in the order of cabling onto the thyristor arms T1, T2, T3. The thyristor arm T1 is therefore connected onto the phase L1, the thyristor arm T2 is connected to the phase L2 and the thyristor arm T3 is connected to the phase L3. It is clear that the real phases of the supply network correspond to the phases L1, L2, L3 to within one permutation of the indices.

In the motor M, a first winding U is situated between the terminals U1 and U2, a second winding V between the terminals V1 and V2 and a third winding W between the terminals W1 and W2.

Figure 3:
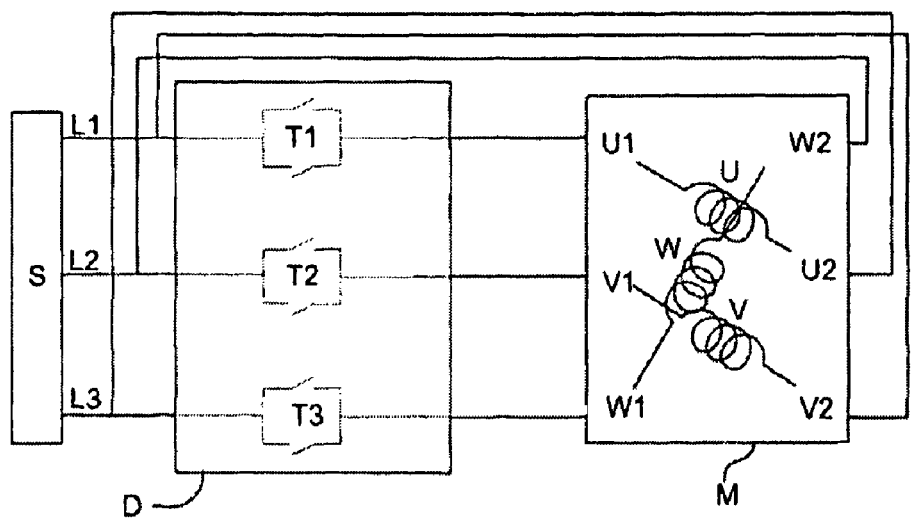
FIG. 3 shows schematically the motor and the starter connected by an incorrect cabling.
Figure 4A:
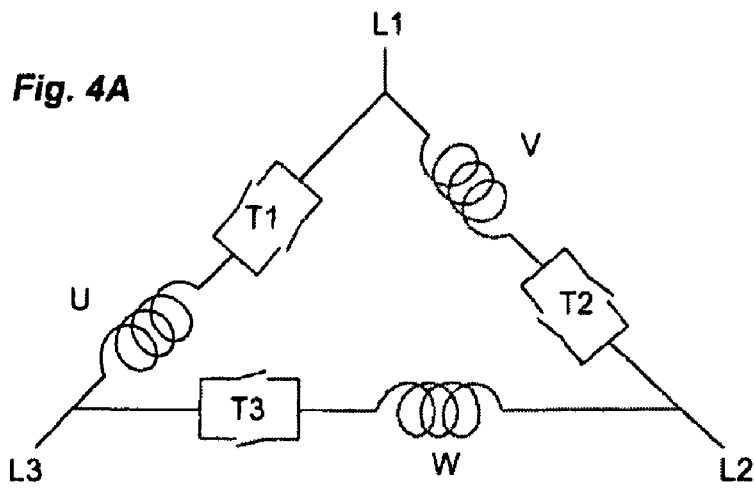
FIG. 4A shows the delta configuration resulting from the incorrect cabling shown in FIG. 3.

One of the cabling errors consists for example in inverting two phases. The configuration known as 'wrong delta' shown in FIGS. 3 and 4A is then obtained in which the phases L2 and L3 are reversed. More precisely, in this 'wrong delta' configuration, the output W2 of the motor M is fed back onto the phase L2 of the network, the output U2 of the motor is connected to the phase L3 and the output V2 of the motor is connected to phase L1 of the network. The inversion of the phases L2 and L3 has an unavoidable effect on the priming of the thyristor arm T1. Indeed, in a known manner, the thyristor arm T1 is primed after a priming delay x determined from the passage through zero of the compound voltage V12 applied to the branch of the delta configuration situated between the phases L1 and L2. Now, if, because of a cabling error, the voltage applied is not V12 but actually V13, in other words the voltage applied between the phases L1 and L3, the current demand during the priming operation of the thyristor arm T1 will not be as expected.

Figure 8:
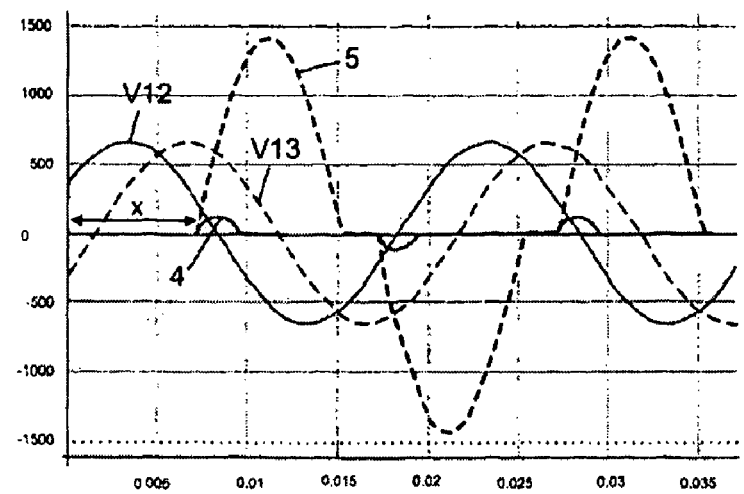
FIG. 8 shows a diagram on which are traced the voltage curves V12 and V13, together with the resulting generated current, for a given priming delay x.

FIG. 8 allows this principle to be explained. If the cabling is correct, after the priming delay x, the voltage V12 is low which results in a low current demand in the thyristor arm T1 (curve 4, FIG. 8). On the other hand, if the cabling is incorrect, the voltage across the terminals of the thyristor arm is not V12 but actually V13 and, after the priming delay x, this voltage V13 is close to its maximum creating a high current demand (curve 5, FIG. 8) across the thyristor arm T1 which can lead to malfunctions in the starter D and cause damage in the motor M.

Figure 4B:
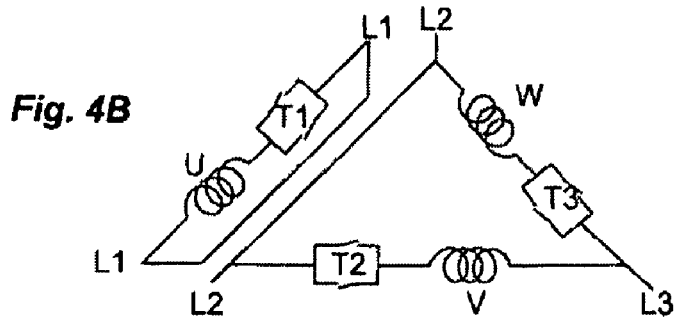
Figure 4E:
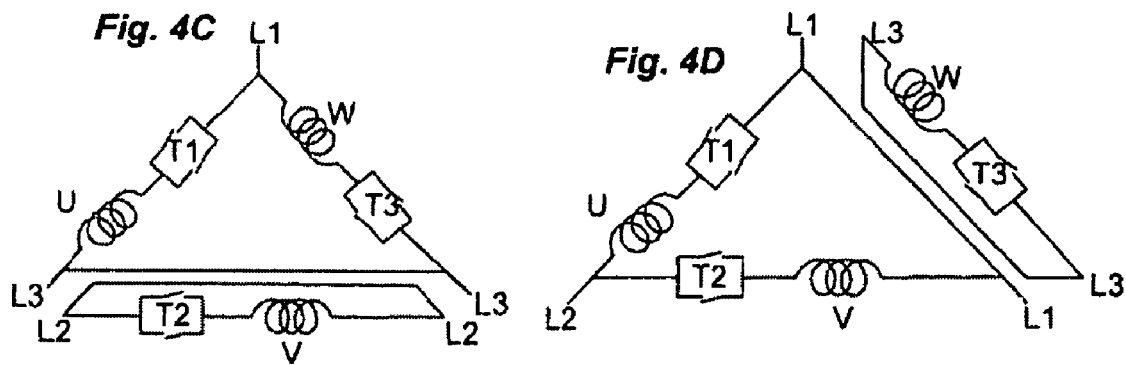
Figure 4E:
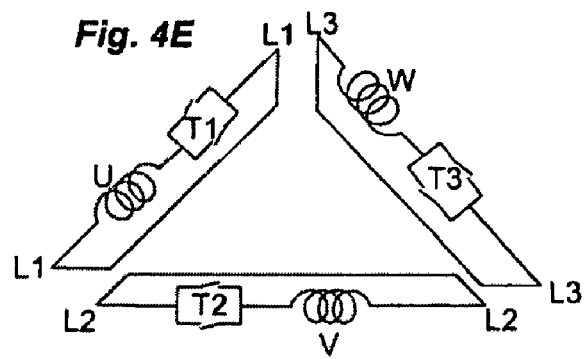

FIGS. 4B to 4E show other possible cabling errors between the motor M and the starter D. In FIG. 4B, the winding U is in short-circuit. In FIG. 4C, the winding V is in short-circuit. In FIG. 4D, the winding W is in short-circuit. In FIG. 4E, all the windings U, V, W of the motor M are in short-circuit.

The control method and system according to the invention allow the cabling errors to be detected during a diagnostic phase. This diagnostic phase can be initiated for example automatically before each start-up of the motor M or only before a first start-up of the motor M. It may also be voluntarily initiated by the user for example after the cabling of the starter D onto the motor M.

The control system comprises processing means 11 coupled to control means 10 of the thyristor arm T1, T2, T3, to storage means and to means for measurement of the current 12 flowing through each branch of the delta configuration (FIG. 2).

The diagnosis is for example performed branch by branch.

Figure 5:
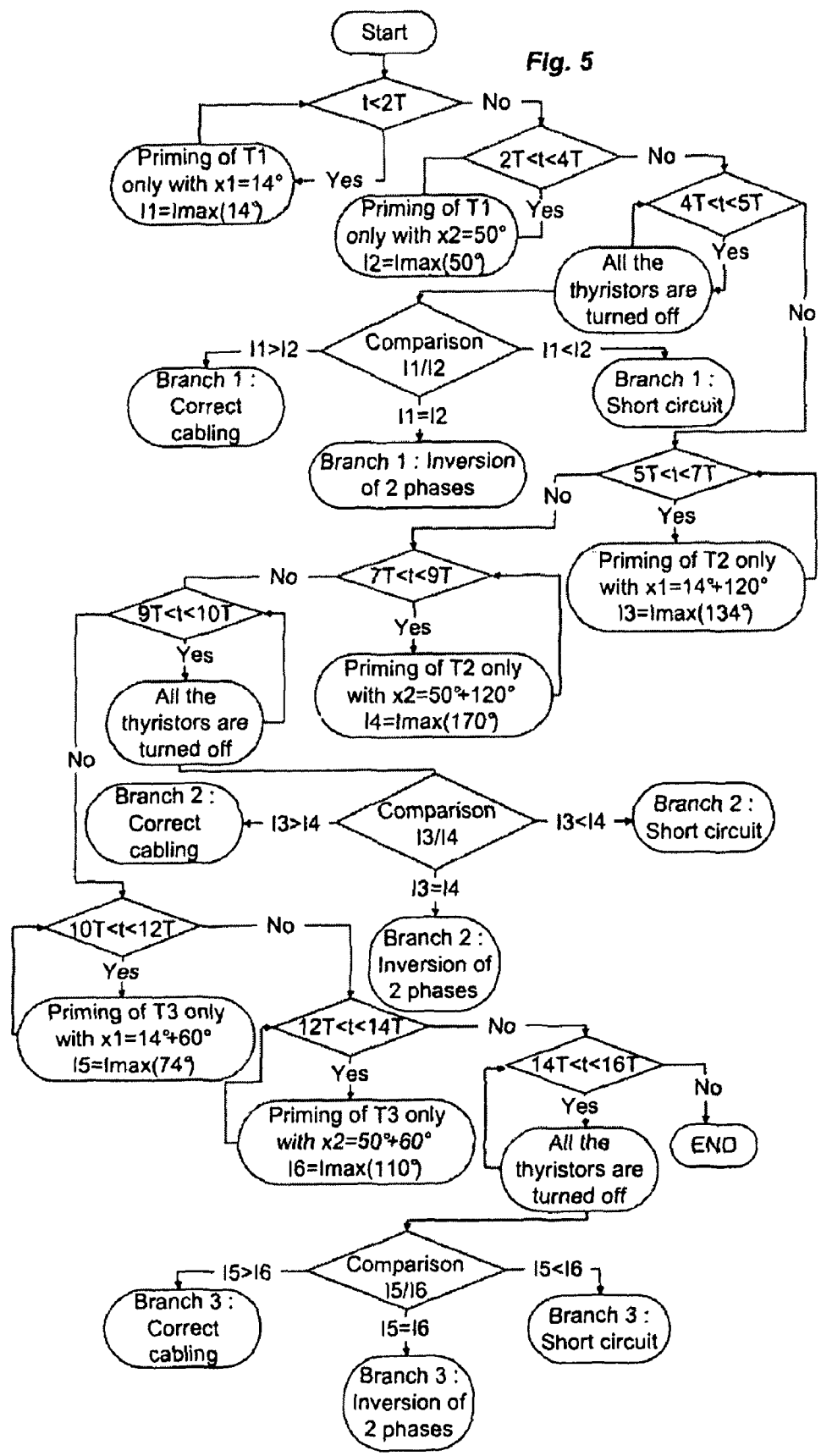
FIG. 5 shows a first algorithm implemented in the control method of the invention for detecting the errors in cabling between the motor and the starter.

A first solution for detecting the cabling errors consists, thanks to the processing means 11 of the control system, in running the algorithm represented in FIG. 5. This algorithm comprises the following steps:

For a certain time, for example less than two periods (2T), the thyristor arm T1 of the first branch receives a priming command from the control means 10, after a given priming delay x1 for example equal to 14°.

Then, for a second period of time, for example in the range between 2T and 4T, the same thyristor arm T1 receives a priming command from the control means 10, after a given priming delay x2, different from x1 and for example equal to 50°.

Before performing a diagnosis on the cabling of this first branch of the delta, the thyristor arms T1, T2 and T3 then receive a command to turn off.

By means of a current sensor, the current flowing in the thyristor arm T1 is measured during each of the two priming operations.

The current maxima I1 and I2 having flowed through the thyristor arm T1 upon each priming operation are then determined thanks to a current detector and are stored in the storage means.

Thanks to the processing means 11, the two current maxima I1, I2 obtained are compared in order to determine whether the cabling of the first branch of the delta is correct or erroneous. The determination of the configuration of the cabling is carried out by the processing means 11 according to the following principles:
if I1>I2, this means that the cabling of the first branch is correct,
if I1<I2, this means that the first branch is in short-circuit,
if I1=I2 and I1 and I2 are near 0, this means that two phases are inverted on the first branch.

These results may be deduced from the curves Imax=f(x) traced for the 'wrong delta' configuration and for the recommended configuration (FIG. 9). Indeed, in the neighbourhood of certain values of the priming delay x, it is noted that, for example, for the recommended configuration (curve 1) Imax (14°)>Imax(50°), whereas for the wrong configuration (curve 2) Imax(14°)<Imax(50°). The values of x1 and x2 must of course be chosen so that the difference between the measured maximum currents I1 and I2 is sufficiently visible and sufficient for diagnosing the configuration of the cabling. It is clear that values other than 14° and 50° may be perfectly suitable for the implementation of the detection method described hereinabove.

The procedure described for the first branch is then reproduced for the second and third branches respectively containing the thyristor arms T2 and T3, for example in a continuous manner from the determination of the cabling of the first branch. Since the phases of the network are phase-shifted by 60° and 120°, the priming delays x1 and x2 are shifted by 120° for the second branch containing the thyristor arm T2 and shifted by 60° for the third branch containing the thyristor arm T3. The maximum currents recovered are I3 and I4 for the second branch and I5 and I6 for the third branch.

Of course, if the cabling is correct for two branches, it can also be correct for the third branch and the latter does not therefore need to be tested.

A second solution for detecting the cabling errors consists in comparing the maximum current obtained in each branch during the priming of a thyristor arm T1, T2, T3, after a given priming delay x, with the nominal current Inom of the motor M. For this purpose, the chosen priming delay x must correspond to that for which the maximum current flowing in the branch is equal to the nominal current Inom of the motor M when the cabling is correct. The value of this priming delay x may be deduced from the diagram shown in FIG. 9 on which the curve 3 Imax=Inom is traced. With reference to this FIG. 9, the priming delay x chosen is 120° for the first branch containing the first thyristor arm T1, 240° for the second branch containing the second thyristor arm T2 and 180° for the third branch containing the third thyristor arm T3. The nominal current Inom of the motor M is a parameter which is for example initially input by the user.

Figure 6:
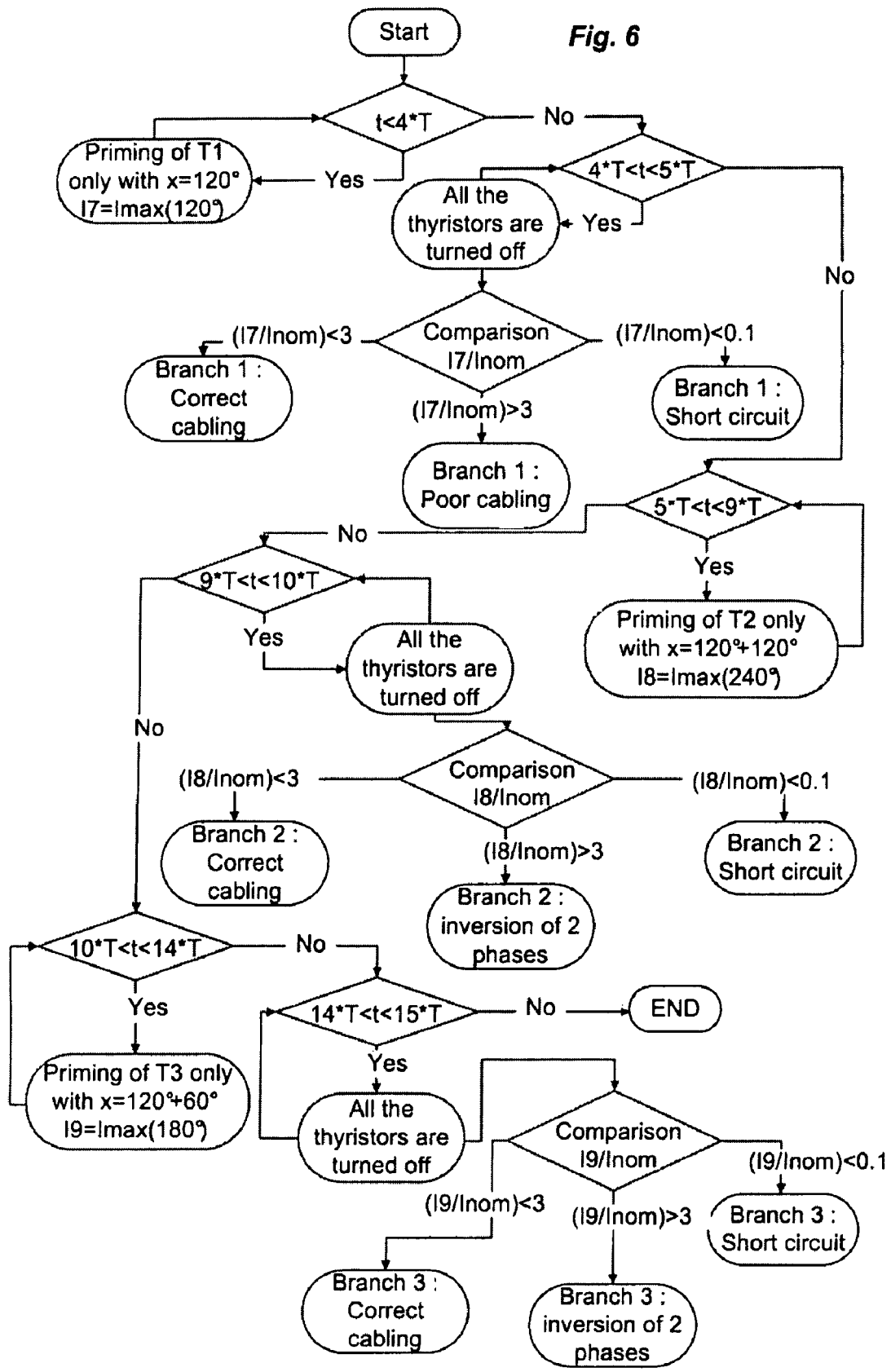
FIG. 6 shows a second algorithm implemented in the control method of the invention for detecting the errors in cabling between the motor and the starter.

The algorithm relating to this second solution is shown in FIG. 6. The detection procedure is as follows:

For a certain time, for example in the range between zero and four periods (4T), the first thyristor arm T1 receives a priming command from the control means 10 with a priming delay x of 120°.

By means of a current sensor, the current flowing in the first branch is measured.

By means of a current detector, the maximum value of the measured current I7=Imax(120°) is extracted and stored.

After the four periods, all the thyristors could receive commands to turn off.

The processing means 11 subsequently carry out a comparison between the maximum current obtained I7 during the priming operation and the nominal current of the motor Inom in order to determine whether the cabling is correct or not, according to the following principles:
if I7 is much higher than Inom, for example if I7/Inom>3, this means that the cabling of the first branch is wrong,
if I7 is close to Inom, for example if I7/Inom<3 and I7/Inom>0.1, this means that the cabling of the first branch is correct,
if I7 is much lower than Inom, for example if I7/Inom<0.1 this means that there is no current and hence that the first branch is in short-circuit.

The procedure thus described is reproduced for the second and third branches of the delta configuration respectively shifting the value of the priming delay x by 120° for the second branch containing the thyristor arm T2 and by 60° for the third branch containing the thyristor arm T3. The determination of the configuration of the cabling is then carried out in an identical manner by comparing the maximum current obtained I8, I9 during each priming of the two other branches with the nominal current of the motor Inom. If the cabling of two branches tested is correct, the cabling of the third branch can also be correct and the latter does not necessarily need to be tested.

With respect to the other methods described in this application, this latter method has the advantage of generating a current demand of Inom if the cabling is already in the correct configuration, which presents no risk of damage to the motor. If the cabling is in the wrong configuration (inversion of two phases), the current demand is 6*Inom which is perfectly reasonable as far as the diagnosis is concerned.

A third solution consists in studying the variation of the priming delay x between an initial reference priming delay x0 for which the maximum current flowing in the branch is theoretically equal or close to the nominal current Inom of the motor M when the cabling is in a given configuration and a final priming delay xf for which the maximum current flowing in the branch is truly equal to the nominal current Inom of the motor M. The initial priming delay x0 has for example a value close to that for which the maximum current obtained in the branch is equal to the nominal current Inom of the motor M when the cabling is correct or in phase inversion. With reference to FIG. 9 and as already studied in the previous solution, the initial priming delay x0 is therefore for example close to the value of 120° for which the cabling of the first branch is correct.

Figure 7:
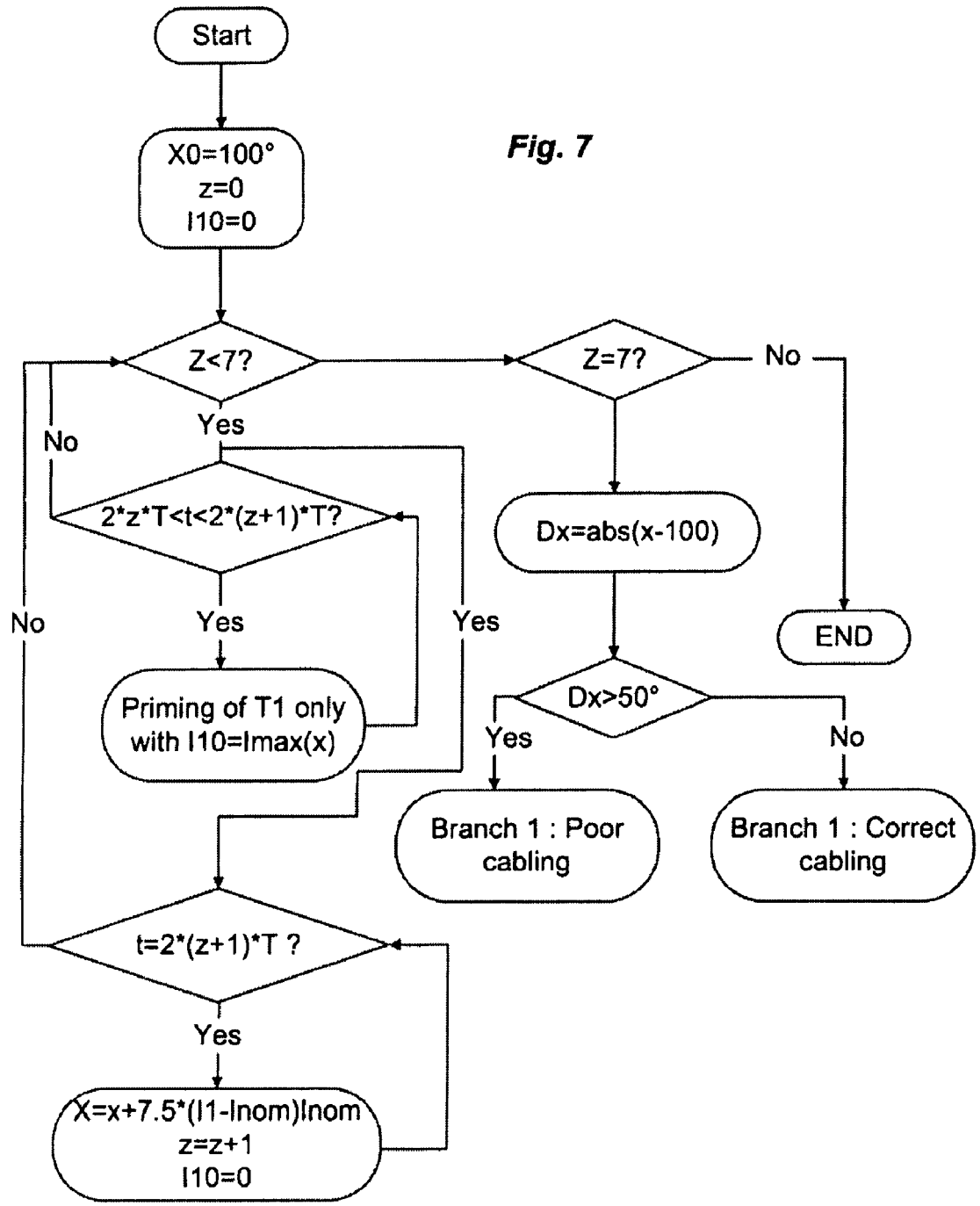
FIG. 7 shows a third algorithm implemented in the control method of the invention for detecting the errors in cabling between the motor and the starter.

The algorithm relating to this third solution is represented in FIG. 7. The detection procedure is the following:

For a certain time, for example equal to two periods, the thyristor arm T1 receives a priming command with the initial priming delay x0. The initial priming delay x0 is for example 100°.

By means of a current sensor and a current detector, the current maximum I10 generated in the first branch during the priming operation is determined and stored.

When the two periods have ended, the priming delay x is recalculated according to the following formula:

$$x_{n+1} = x_n + 7.5 * \left(\frac{I1 - Inom}{Inom}\right),$$

the value of 7.5 being the regulation resolution factor. The maximum current I10 is also reset to zero.

The regulation loop is for example executed seven times.

After having carried out the seven loops, a comparison is made between the final priming delay obtained xf, for which the maximum current flowing in the branch is equal to the nominal current Inom of the motor M, and the initial priming delay x0.

Depending on the difference between the final priming delay xf and the initial priming delay x0, the processing means 11 determine whether the cabling is correct or wrong. If there is a significant difference, for example greater than 50°, the cabling of the first branch is erroneous. On the other hand, if the difference is minimal, in other words less than 50°, this implies that the cabling of the first branch is correct. The value of 50° is an example and allows it to be illustrated that there is a noticeable difference between the initial priming delay x0 and the final priming delay xf when the cabling is incorrect.

The algorithm is executed successively in the same manner on the three branches of the delta so as to obtain a diagnosis on each of them. If the cabling of two branches is correct, the cabling of the third branch can be considered to be correct.

With respect to the first solution described hereinabove, this latter solution requires current demands that are lower or of similar intensity for shorter periods. The maximum current demands are around 7*Inom for 0.05 seconds, whereas for the first method, the current demands are around 8*Inom for 0.3 seconds. This small difference notably allows the motor to be better preserved.

All the solutions previously proposed are implemented by priming the thyristor arms T1, T2, T3 one after the other. Nevertheless, priming the three arms simultaneously may perfectly well be envisaged. However, care must be taken not to cause the motor M to start.

The invention claimed is:

1. A method for controlling an asynchronous electric motor comprising three windings distributed over three branches in a delta configuration, the motor being controlled by a starter comprising a power semiconductor directly connected in series within each of the three branches of the delta configuration of the windings of the motor, said method comprising the steps of:

applying a voltage in a first branch of the delta;

after a first priming delay, a first priming of the semiconductor of the first branch;

measuring an electrical current generated within the first branch during the first priming;

obtaining a maximum value of the electrical current measured within the first branch during the first priming; and determining a configuration of a cabling of the first branch as a function of the maximum value of the electrical current.

2. The method according to claim 1, further comprising:

after the first priming and after a second priming delay separate from the first priming delay, a second priming of the semiconductor of the first branch; and measuring an electrical current generated during the second priming operation, wherein the determining the configuration of the cabling of the first branch includes comparing between a maximum value of the electrical current measured during the first priming operation and a maximum value of the electrical current measured during the second priming operation.

3. The method according to claim 1, wherein the determining the configuration of the cabling of the first branch includes comparing between a nominal current of the motor and a maximum value of the electrical current measured during the first priming operation after the first priming delay.

4. The method according to claim 3, wherein a value of the first priming delay corresponds to a delay for which the maximum current measured in the first branch during the first priming operation is theoretically equal to the nominal current of the motor when the first branch is correctly cabled.

5. The method according to claim 1, further comprising:

successive priming operations of the semiconductor of the first branch, after the first priming and each after a respective variable priming delay, and measuring an electrical current generated within the first branch during each successive priming operation, wherein the respective variable priming delays vary for each successive priming operation until a final priming delay is obtained for which a maximum electrical current measured is substantially equal to a nominal current of the motor, and the determining the configuration of the cabling of the first branch includes comparing between the first priming delay and the final priming delay.

6. The method according to claim 5, wherein a value of the first priming delay corresponds to an initial reference priming delay for which the maximum current measured in the first branch during the first priming operation is theoretically equal to a nominal current of the motor when the first branch is correctly cabled.

7. The method according to one of claims 1 to 6, implemented successively on each of the three branches of the delta configuration of the windings of the motor.

8. The method according to claim 2, wherein the determining the configuration step determines the cabling of the first branch to be correct, in short-circuit, or phase inverted.

9. The method according to claim 8, wherein the determining the configuration step determines the cabling to be correct when the maximum value of the electrical current measured during the first priming is greater than the maximum value of the electrical current measured during the second priming, the determining the configuration step determines the cabling to be phase inverted when the maximum value of the electrical current measured during the first priming is equal to the maximum value of the electrical current measured during the second priming, and the determining the configuration step determines the cabling to be in short-circuit when the maximum value of the electrical current measured during the first priming is less than the maximum value of the electrical current measured during the second priming.

10. The method according to claim 4, wherein
the determining the configuration step determines the cabling of the first branch to be incorrect, correct, or in short-circuit.

11. The method according to claim 10, wherein
the determining the configuration step determines the cabling to be incorrect when the maximum value of the electrical current measured during the first priming is substantially greater than the nominal value of the electrical current of the motor, the determining the configuration step determines the cabling to be correct when the maximum value of the electrical current measured during the first priming is substantially equal to the nominal value of the electrical current of the motor, and the determining the configuration step determines the cabling to be in short-circuit when the maximum value of the electrical current measured during the first priming is substantially less than the nominal value of the electrical current of the motor.

12. A system for controlling an asynchronous electric motor comprising three windings distributed over three branches in a delta configuration, the motor being controlled by a starter comprising a power semiconductor directly connected in series within each of the three branches of the delta configuration of the windings of the motor, said system comprising:

a switching unit to apply a voltage in a first branch of the delta;

a control unit to perform, after a first priming delay, a first priming of the semiconductor of the first branch;

a measuring unit to measure an electrical current generated in the first branch during the first priming;

a processing unit to obtain a maximum value of the electrical current measured within the first branch during the first priming and to determine a configuration of the cabling of the first branch as a function of the maximum value of the electrical current.

13. The system according to claim 12, wherein
the control unit performs, after the first priming and after a second priming delay separate from the first priming delay, a second priming of the semiconductor of the first branch, the measuring unit measures an electrical current generated during the second priming operation, and the processing unit compares between a maximum value of the electrical current measured during the first priming operation and a maximum value of the electrical current measured during the second priming operation in order to determine the configuration of the cabling of the first branch.

14. The system according to claim 12, wherein
the processing unit compares between a nominal current of the motor and a maximum value of the electrical current measured during the first priming operation after the first priming delay in order to determine the configuration of the cabling of the first branch.

15. The system according to claim 14, wherein
a value of the first priming delay corresponds to a delay for which the measured maximum current in the first branch during the first priming operation is theoretically equal to the nominal current of the motor when the first branch is correctly cabled.

16. The system according to claim 12, wherein
the control unit performs successive priming operations of the semiconductor of the first branch, each successive priming operation after the first priming and each after a respective variable priming delay, the measuring unit measures an electrical current generated within the first branch during each successive priming operation, the respective variable priming delays vary for each successive priming operation until a final priming delay is obtained for which a maximum electrical current measured is substantially equal to a nominal current of the motor, and the processing unit compares between the first priming delay and the final priming delay in order to determine the configuration of the cabling of the first branch.

17. The system according to claim 16, wherein
a value of the first priming delay corresponds to an initial reference priming delay for which the measured maximum current in the first branch during the first priming operation is theoretically equal to a nominal current of the motor when the first branch is correctly cabled.

* * * * *